United States Patent
Yoshijima et al.

(10) Patent No.: US 8,123,230 B2
(45) Date of Patent: Feb. 28, 2012

(54) CYLINDER HEAD GASKET

(75) Inventors: Kazuya Yoshijima, Okazaki (JP);
Yasumaro Takeda, Toyota (JP); Shigeo Kiyoi, Toyota (JP)

(73) Assignees: Toyota Jidosha Kabushiki Kaisha, Toyota (JP); Nippon Gasket Co., Ltd., Toyota (JP)

( * ) Notice: Subject to any disclaimer, the term of this patent is extended or adjusted under 35 U.S.C. 154(b) by 538 days.

(21) Appl. No.: 12/308,749

(22) PCT Filed: Jul. 2, 2007

(86) PCT No.: PCT/IB2007/001806
§ 371 (c)(1),
(2), (4) Date: Dec. 23, 2008

(87) PCT Pub. No.: WO2008/004078
PCT Pub. Date: Jan. 10, 2008

(65) Prior Publication Data
US 2009/0189359 A1    Jul. 30, 2009

(30) Foreign Application Priority Data
Jul. 3, 2006 (JP) .................................. 2006-183314

(51) Int. Cl.
*F02F 11/00* (2006.01)
(52) U.S. Cl. ....................................... 277/593; 277/598
(58) Field of Classification Search .......... 277/591–593, 277/598
See application file for complete search history.

(56) References Cited

U.S. PATENT DOCUMENTS

| | | | |
|---|---|---|---|
| 5,628,518 A | 5/1997 | Ushio et al. | |
| 6,431,554 B1 | 8/2002 | Miyamoto et al. | |
| 6,796,562 B2 * | 9/2004 | Stapel | 277/594 |
| 2002/0105148 A1 | 8/2002 | Heilig et al. | |
| 2006/0097459 A1 | 5/2006 | Hohe et al. | |
| 2006/0119050 A1 * | 6/2006 | Tripathy et al. | 277/592 |

FOREIGN PATENT DOCUMENTS

| | | | |
|---|---|---|---|
| JP | U-3-46070 | * | 4/1991 |
| JP | 04077592 A | * | 3/1992 |
| JP | A-4-77592 | * | 3/1992 |
| JP | U-7-12660 | * | 3/1995 |
| JP | A-8-121597 | | 5/1996 |
| JP | A-10-61772 | | 3/1998 |
| JP | B2-2935544 | | 6/1999 |
| JP | A-2001-12611 | * | 1/2001 |
| JP | A-2001-82610 | * | 3/2001 |
| JP | A-2001-295941 | * | 10/2001 |
| JP | A-2004-278715 | * | 10/2004 |

* cited by examiner

*Primary Examiner* — Vishal Patel
(74) *Attorney, Agent, or Firm* — Oliff & Berridge, PLLC

(57) ABSTRACT

A cylinder head gasket includes a first gasket base plate at a cylinder head side, a second gasket base plate at a cylinder block side, a shim that adjusts the gasket thickness, and a pressure increasing plate that increases the surface pressure at the side of periphery portions of the cylinders. In the first and second gasket base plates full beads are swollen at the side of periphery portions of cylinders, and half beads are swollen at a site outward of the full beads. The full beads of the first and second gasket base plates are formed so that top portions of the full beads face each other at positions that are opposite to each other in the up-down direction. The shim and the pressure increasing plate are sandwiched between the top portions.

17 Claims, 4 Drawing Sheets

CYLINDER HEAD GASKET

BACKGROUND OF THE INVENTION

1. Field of Invention

The invention relates to a cylinder head gasket disposed between a cylinder block and a cylinder head of an engine.

2. Description of Related Art

In recent years, in association with improvements in the performance of motor vehicle-purpose engines and, particularly, diesel engines, the combustion pressure of the engines is increasing, and a trend toward increased in-cylinder pressures of the engines is progressing. Due to the trend toward increased in-cylinder pressures, there is a tendency toward increased relative movements between the cylinder block and the cylinder head and, therefore, increased amounts of gap between the cylinder block and the cylinder head. This leads to higher requirements for the sealing performance provided by a cylinder head gasket interposed between the cylinder block and the cylinder head.

An example of a cylinder head gasket in which the sealing performance of a cylinder periphery portion-side portion (around the combustion chambers) is intended to be improved (e.g., see Japanese Patent No. 2935544). Japanese Patent No. 2935544 discloses a cylinder head gasket in which a gasket subsidiary plate whose thickness is greater in a cylinder periphery portion-side region than in a region outward of the cylinder periphery portion-side region, and a plurality of gasket base plates each provided with a full bead formed in a cylinder periphery portion-side region are stacked. The gasket subsidiary plate is sandwiched between full-bead skirt portions of adjacent gasket base plates, and full-bead top portions of the gasket base plates sandwiching the gasket subsidiary plate are superimposed on full-bead top portions of other gasket base plates.

According to the cylinder head gasket described in Japanese Patent No. 2935544, since the thickness of the gasket subsidiary plate is greater in the cylinder periphery portion-side region than in the region outward of the cylinder periphery portion-side region, the surface pressure on the cylinder periphery portion can be increased; however, the following problems occur.

Since the cylinder periphery portion-side region of the gasket subsidiary plate and the region outward of the cylinder periphery portion-side region are provided as a single member, it is difficult in an application to a multi-cylinder engine to vary the thickness of the cylinder periphery portion-side region of the gasket subsidiary plate with respect to the individual cylinders. Thus, a problem is that it becomes difficult to change the surface pressure balance between the cylinder periphery portion-side region and the region outward of the cylinder periphery portion-side region, with respect to the individual cylinders.

Furthermore, since the full-bead top portions of the gasket base plates sandwiching the gasket subsidiary plate are stacked on full-bead top portions of other gasket base plates, that is, since adjacent gasket base plates are stacked so that the full-bead top portions of the gasket base plates face each other, there is a possibility of adjacent gasket base plates deviating from each other in a direction parallel to the base plate plane during assembly or the like. This leads to a problem that at the site of occurrence of such deviation, the tight closure characteristic declines and there occurs dispersion in the surface pressure.

SUMMARY OF THE INVENTION

It is an object of the invention to provide a cylinder head gasket that secures stable sealing performance by reducing the deviation between adjacent gasket base plates while heightening the follow-up characteristic with respect to the gap between a cylinder block and a cylinder head associated with the increased in-cylinder pressure of the engine.

A cylinder head gasket in accordance with a first aspect of the invention is interposed between a cylinder block and a cylinder head. The cylinder head gasket includes: a first gasket base plate positioned at a cylinder head side and having a combustion chamber hole for connecting the combustion chamber; a second gasket base plate positioned at a cylinder block side and having a combustion chamber hole for connecting the combustion chamber; a thickness adjusting plate; and a pressure increasing plate. Each of the first and second gasket base plates has a swollen full bead at a combustion chamber hole side, and has a swollen half bead outward of the full bead. The full beads of the first and second gasket base plates are formed so that full-bead top portions of the full beads face each other in an up-down direction. The thickness adjusting plate and the pressure increasing plate are sandwiched between the full-bead top portions.

According to the foregoing construction, as the in-cylinder pressure of the engine increases, the relative movement between the cylinder block and the cylinder head enlarges, and the gap between the cylinder block and the cylinder head enlarges. However, since the plurality of gasket base plates having spring characteristic are stacked, the follow-up characteristic with respect to the gap between the cylinder block and the cylinder head can be heightened.

Besides, since the thickness adjusting plate and the pressure increasing plate are provided as separate members, the thickness of the pressure increasing plate can easily be changed for each of the cylinders of the engine. Therefore, the surface pressure balance between the portion at the combustion chamber hole side and the portion outward of the portion at the combustion chamber hole side can easily be changed for each cylinder, so that the tight closure characteristic can be improved for each cylinder.

Furthermore, although the first and second gasket base plates are stacked so that their full-bead top portions face each other, the thickness adjusting plate and the pressure increasing plate are interposed between the first and second gasket base plates. Therefore, even if during assembly or the like, the first and second gasket base plates deviate from each other in a direction parallel to the base plate plane, the full-bead top portions are unlikely to deviate from each other in the direction perpendicular to the base plate plane. Hence, decline of the tight closure characteristic can be prevented, and occurrence of dispersion in the surface pressure can be prevented, so that stable sealing performance can be secured.

In the first aspect, the cylinder head gasket may further include a third gasket base plate stacked at the cylinder head side of the first gasket base plate. The third gasket base plate has a swollen third full bead at a combustion chamber hole side, and has a swollen third half bead at a position that is farther from the combustion chamber hole than the third full bead is and the third full bead of the third gasket base plate is formed so that a full-bead skirt portion of the third full bead faces a full-bead skirt portion of the first full bead of the first gasket base plate at a position where the third full bead is opposite to the first full bead in an up-down direction.

According to the foregoing construction, the third gasket base plate is stacked on the cylinder head side of the first gasket base plate, and the full-bead skirt portion of the third gasket base plate and the full-bead skirt portion of the first gasket base plate face each other. Therefore, even if during assembly or the like, the third gasket base plate and the first gasket base plate deviate from each other in a direction parallel to the base plate plane, the top portions of the full-bead portions of the two gasket base plates do not deviate from each other in a direction perpendicular to the base plate plane.

In the above-described first aspect, the cylinder head gasket may further include a fourth gasket base plate stacked at the cylinder block side of the second gasket base plate. The fourth gasket base plate has a swollen fourth full bead at a combustion chamber hole side, and a swollen fourth half bead at a position that is farther from the combustion chamber hole than the fourth full bead is, and the fourth full bead of the fourth gasket base plate is formed so that a full-bead skirt portion of the fourth full bead faces a full-bead skirt portion of the second full bead of the second gasket base plate at a position where the fourth full bead is opposite to the second full bead in the up-down direction.

According to this construction, the fourth gasket base plate is stacked on the cylinder block of the second gasket base plate, and the full-bead skirt portion of the fourth gasket base plate and the full-bead skirt portion of the second gasket base plate face each other. Therefore, even if during assembly or the like, the fourth gasket base plate and the second gasket base plate deviate from each other in a direction parallel to the base plate plane, the top portions of the full-bead portions of the two gasket base plates do not deviate from each other in the direction perpendicular to the base plate plane.

Thus, since adjacent gasket base plates are stacked so that their skirt portions, not their top portions, face each other, the top portions of the adjacent gasket base plates do not deviate from each other in the direction perpendicular to the base plate plane. In consequence, decline of the tight closure characteristic can be prevented, and occurrence of dispersion in the surface pressure can be prevented, so that stable sealing performance can be secured.

According to the foregoing aspect of the invention, it is possible to secure stable sealing performance by reducing the deviation between adjacent gasket base plates while heightening the follow-up characteristic with respect to the gap between the cylinder block and the cylinder head associated with the increased in-cylinder pressure of the engine.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Best forms for carrying out the invention will be described with reference to the accompanying drawings.

Figure 1:
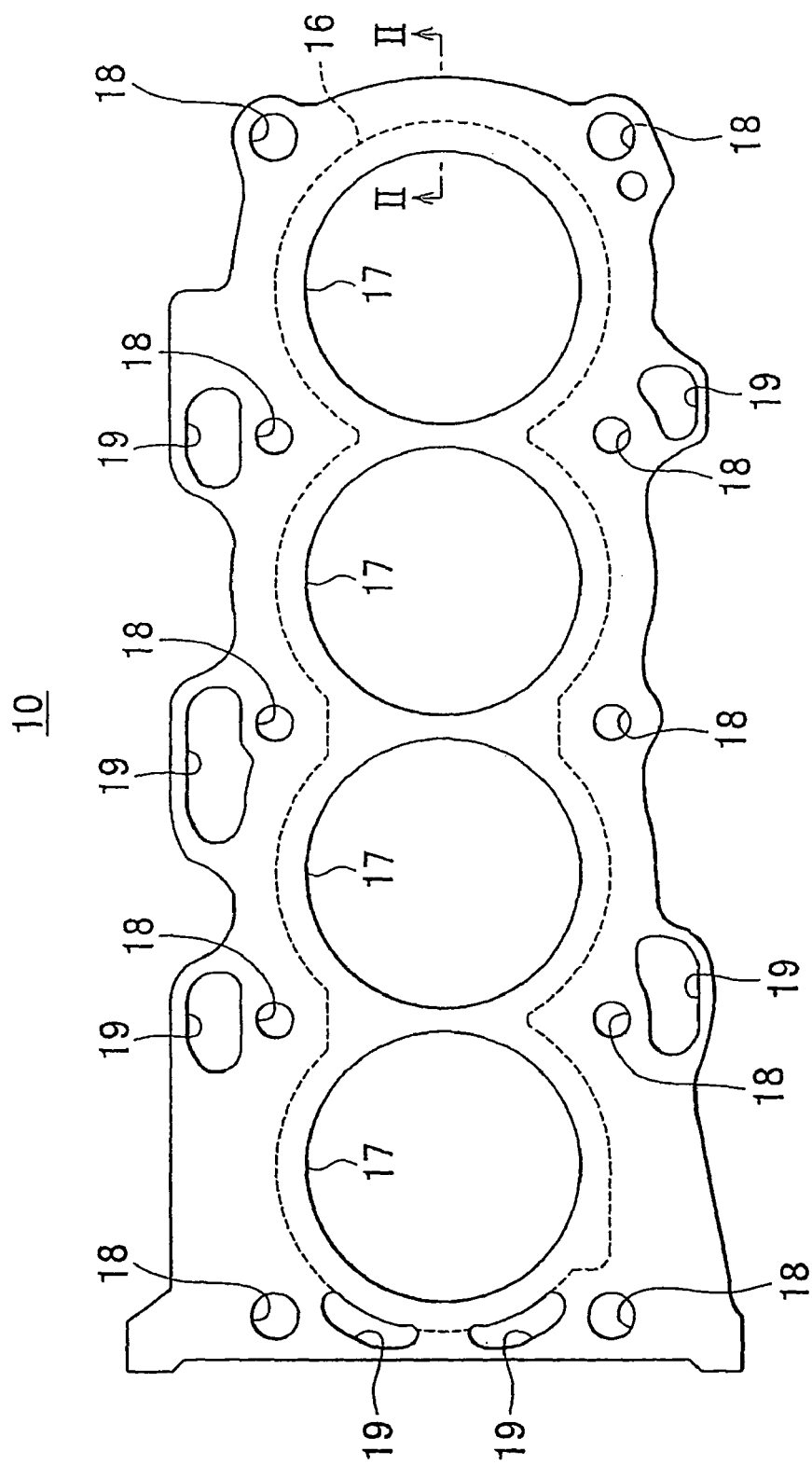
FIG. 1 is a plan view showing an embodiment of a cylinder head gasket to which the invention is applied.
Figure 2:
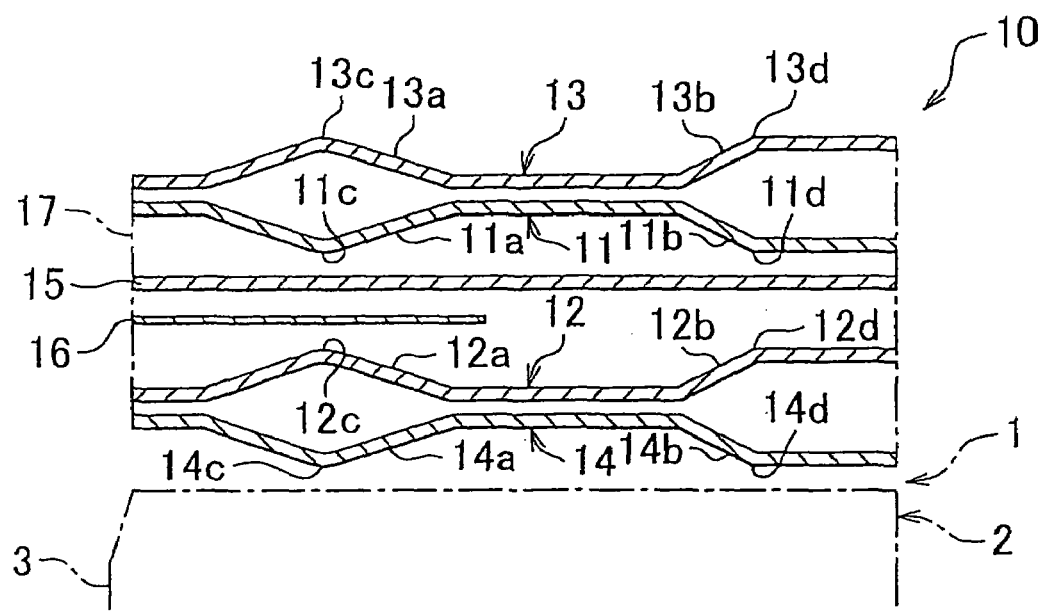
FIG. 2 is a sectional view taken along line II-II of FIG. 1.

FIGS. 1 and 2 show a cylinder head gasket for an in-line four-cylinder diesel engine (hereinafter, referred to as "engine"). A cylinder head gasket 10 in this example is disposed between a cylinder block 2 and a cylinder head (not shown) of an engine 1. Then, by integrally uniting the lower-side cylinder block 2 disposed and the upper-side cylinder head via fastening bolts, the cylinder head gasket 10 is sandwiched between the cylinder block 2 and the cylinder head, so that the gap between the cylinder block 2 and the cylinder head is sealed.

The cylinder head gasket 10 includes a plurality of gasket base plates (first to fourth gasket base plates 11 to 14) that are stacked together with a shim 15 and a pressure increasing plate 16 on top of one another. The gasket base plates, the shim 15 and the pressure increasing plate 16 are integrally fastened together by known fastening means (e.g., a lance lock or the like). The cylinder head gasket 10 has four combustion chamber holes 17 that are formed in conformity with the positions of cylinders 3. Besides, the cylinder head gasket 10 has a plurality of bolt holes 18 through which fastening bolts for fastening the cylinder block 2 and the cylinder head together are inserted, a plurality of cooling water holes 19 through which cooling water flows, a plurality of lubricating oil holes through which lubricating oil flows, etc.

The shim 15 is a plate for adjusting the thickness of the cylinder head gasket 10, and is a generally flat metal plate that is provided so as to achieve a predetermined capacity of combustion chambers of the engine 1. The shim 15 extends from a combustion chamber hole 17 side (the side of periphery portions of the cylinders 3) of the cylinder head gasket 10 in directions away from the combustion chamber holes 17 (outward of the periphery portions of the cylinders 3), for example, to a periphery portion of the cylinder head gasket 10. By suitably setting the thickness of the shim 15, the thickness of the cylinder head gasket 10 is adjusted, and therefore the capacity of the each combustion chamber of the engine 1 is adjusted.

The pressure increasing plate 16 is a generally flat metal plate provided for increasing the surface pressure around the combustion chamber holes 17. As shown by a dashed line in FIG. 1, the pressure increasing plate 16 is provided around the combustion chamber holes 17 of the cylinder head gasket 10. Concretely, the pressure increasing plate 16 extends from end portions on the side of periphery portions of the cylinders 3 to regions that are outward of the positions at which top portions 11c, 12c of full-bead portions 11a, 12a of the first and second gasket base plates 11, 12 described below are opposite to each other. By suitably setting the thickness of the pressure increasing plate 16, the surface pressure in a region around the combustion chamber holes 17 is made higher than the surface pressure in a region outward the region around the combustion chamber holes 17, so as to adjust the surface pressure balance between the region around the combustion chamber holes 17 and the region outward thereof.

As for the gasket base plates, two of them are provided on each of the cylinder head side (the upper side in FIG. 2) and the cylinder block 2 side (the lower side in FIG. 2). Concretely, first and third gasket base plates 11, 13 are stacked at the upper side of the shim 15 and the pressure increasing plate 16, and second and fourth gasket base plates 12, 14 are stacked at the lower side of the shim 15 and the pressure increasing plate 16. In other words, the first and second gasket base plates 11, 12 are provided so as to be opposite to each other with the shim 15 and the pressure increasing plate 16 interposed between the first and second gasket base plates 11, 12, and the third and fourth gasket base plates 13, 14 are provided so as to be opposite to each other with the first and second gasket base plates 11, 12 interposed between the third and fourth gasket base plates 13, 14.

The first to fourth gasket base plates 11 to 14 are made of a material that has spring characteristic and has a higher hardness than the aluminum-based alloy, the cast iron or the like used to form the cylinder block 2 and the cylinder head, for example, a material such as stainless steel, SECC, etc. The first to fourth gasket base plates 11 to 14 are formed so as to have the same thickness in the entire region thereof. The first and second gasket base plates 11, 12 opposite to each other across the shim 15 and the pressure increasing plate 16 are formed so as to have shapes that are symmetrical to each other with respect to a plane (referred to as the "base plate plane") that is orthogonal to the stacking direction (the up-down direction) of the gasket base plates. Specifically, the first and second gasket base plates 11, 12 have, at the combustion chamber hole 17 side thereof (the side of periphery portions of the cylinders 3), full-bead portions 11a, 12a that are opposite to each other in the up-down direction. The full-bead portions 11a, 12a are opposite to each other in the swelling direction (the full-bead portion 11a has a downwardly swollen shape, and the full-bead portion 12a has an upwardly swollen shape). Concretely, the full-bead portions 11a, formed in a portion of the first gasket base plate 11 which is at the side of periphery portions of the cylinders 3, has a chevron shape (a generally trapezoid shape) in section that is swollen toward the cylinder block 2 side (the downward side). On the other hand, the full-bead portions 12a, formed in a portion of the second gasket base plate 12 which is at the side of periphery portions of the cylinders 3, has a chevron shape (a generally trapezoid shape) in section that is swollen toward the cylinder head side (the upward side). In this case, as for the full-bead portions 11a, 12a of the first and second gasket base plates 11, 12, the top portions 11c, 12c that face and are close to each other across the shim 15 and the pressure increasing plate 16, and the skirt portions thereof are formed to be apart from the shim 15 and the pressure increasing plate 16. The full-bead portions 11a, 12a are provided for securing high gas sealing performance of the cylinder head gasket 10.

The full-bead portion 11a and the full-bead portion 12a are designed so as to be equal in the width (the dimension in the right-left direction in FIG. 2) and equal in the amount of swell, and are provided at positions that are opposite to each other in the up-down direction. That is, the full-bead portions 11a, 12a of the first and second gasket base plates 11, 12 are designed so that the dimension from the periphery portions of the combustion chamber holes 17 to the top portion 11c of the full-bead portion 11a of the first gasket base plate 11 is equal to the dimension from the periphery portions of the combustion chamber holes 17 to the top portion 12c of the full-bead portion 12a of the second gasket base plate 12.

The top portions 11c, 12c of the full-bead portions 11a, 12a are provided at the combustion chamber hole 17 side of the end portion of the pressure increasing plate 16 which is remote from the combustion chamber holes 17. Therefore, the shim 15 and the pressure increasing plate 16 are sandwiched between the top portions 11c, 12c of the full-bead portions 11a, 12a that are provided opposite to each other.

Furthermore, half-bead portions 11b, 12b that are opposite to each other in the up-down direction are formed at a side in the first and second gasket base plates 11, 12 which is remote from the combustion chamber holes 17 (a side outward of the periphery portions of the cylinders 3). The swelling directions of the half-bead portions 11b, 12b are opposite to each other. Concretely, the half-bead portion 11b, formed in a portion of the first gasket base plate 11 which is outward of the periphery portions of the cylinders 3, is swollen toward the cylinder block 2 side. On the other hand, the half-bead portion 12b, formed in a portion of the second gasket base plate 12 which is outward of the periphery portions of the cylinders 3, is swollen toward the cylinder head side. As for the half-bead portions 11b, 12b of the first and second gasket base plates 11, 12, the top portions 11d, 12d thereof face each other with the shim 15 interposed between the first and second gasket base plates 11, 12, and skirt portions thereof are formed to be apart from the shim 15. The half-bead portions 11b, 12b are provided for securing high liquid sealing performance of the cylinder head gasket 10.

The half-bead portions 1b, 12b have a cross-sectional shape that is obtained by extending the swell end to a side remote from the combustion chamber holes 17, and are provided at positions that are opposite to each other in the up-down direction. That is, the half-bead portions 11b, 12b of the first and second gasket base plates 11, 12 are designed so that they are equal in the width (the dimension in the left-right direction in FIG. 2) and in the amount of swelling, and so that the dimension from the periphery portions of the combustion chamber holes 17 to the top portion lid of the half-bead portion 11b of the first gasket base plate 11 is equal to the dimension from the periphery portions of the combustion chamber holes 17 to the top portion 12d of the half-bead portion 12b of the second gasket base plate 12. Besides, the amount of swelling of the half-bead portions 11b, 12b is set to be equal to the amount of swelling of the full-bead portions 11a, 12a.

The third gasket base plate 13, stacked on the cylinder head side of the first gasket base plate 11, is formed so as to have a shape that is symmetrical to the shape of the first gasket base plate 11 with respect to the base plate plane. That is, the third gasket base plate 13 has the same shape as the second gasket base plate 12. Concretely, a full-bead portion 13a having a chevron shape (a generally trapezoid shape) in section that is swollen toward the cylinder head side is formed in a portion of the third gasket base plate 13 that is at the side of the periphery portions of the cylinders 3. Furthermore, a half-bead portion 13b swollen toward the cylinder head side is formed in a portion of the third gasket base plate 13 that is outward of the periphery portions of the cylinders 3. The third gasket base plate 13 is provided so that the full-bead portion 13a thereof faces the full-bead portion 11a of the first gasket base plate 11 in the up-down direction. As for the full-bead portions 11a, 13a of the first and third gasket base plates 11, 13, skirt portions thereof face each other, and top portions 11c, 13c thereof are apart from each other.

The fourth gasket base plate 14, stacked on the cylinder block 2 side of the second gasket base plate 12, is formed so as to have a shape that is symmetrical to the shape of the second gasket base plate 12 with respect to the base plate plane. That is, the fourth gasket base plate 14 has the same shape as the first gasket base plate 11. Concretely, a full-bead portion 14a having a chevron shape (a generally trapezoid shape) in section that is swollen toward the cylinder block 2 side is formed in a portion of the fourth gasket base plate 14 that is at the side of the periphery portions of the cylinders 3. Furthermore, a half-bead portion 14b swollen toward the cylinder block 2 side is formed in a portion of the fourth gasket base plate 14 that is outward of the periphery portions of the cylinders 3. The fourth gasket base plate 14 is provided so that the full-bead portion 14a thereof faces the full-bead portion 12a of the second gasket base plate 12 in the up-down direction. As for the full-bead portions 12a, 14a of the first and third gasket base plates 12, 14, skirt portions thereof face each other, and top portions 12c, 14c thereof are apart from each other.

As described above, the shape of the first and fourth gasket base plates 11, 14 and the shape of the second and third gasket base plates 12, 13 are different from each other only in the swelling direction of the full-bead portions and the half-bead portions. Thus, in the cylinder head gasket 10, gasket base plates whose shapes are different from each other only in the swelling direction of the full-bead portions and the half-bead portions are stacked alternately with one another.

According to the cylinder head gasket 10 constructed as described above, the following operation and effects can be achieved.

When the cylinder head gasket 10 is disposed between the cylinder block 2 and the cylinder head and they are integrally united via fastening bolts, the full-bead portions 11a to 14a and the half-bead portions 11b to 14b of the first to fourth gasket base plates 11 to 14 are compressed and deformed in the up-down direction, thereby sealing the gap between the cylinder block 2 and the cylinder head. As a result of the compression of the first to fourth gasket base plates 11 to 14, the spring characteristic of the first to fourth gasket base plates 11 to 14 causes a restoration force in the first to fourth gasket base plates 11 to 14.

Thus, in the cylinder head gasket 10, since the plurality of gasket base plates 11 to 14 having spring characteristic are stacked, the follow-up characteristic with respect to the gap between the cylinder block 2 and the cylinder head can be heightened. Specifically, when the in-cylinder pressure of the engine 1 heightens, the relative movement between the cylinder block 2 and the cylinder head enlarges, and therefore the gap between the cylinder block 2 and the cylinder head enlarges. If the cylinder head gasket 10 is disposed between the cylinder block 2 and the cylinder head as described above, the follow-up characteristic with respect to the gap between the cylinder block 2 and the cylinder head will heighten.

It is to be noted herein that the pressure increasing plate 16 is able to slightly move relative to the shim 15 in the directions parallel to the base plate plane. Then, such slipping of the pressure increasing plate 16 makes it possible to improve the fatigue strength of the cylinder head gasket 10 in the follow-up with respect to the gap between the cylinder block 2 and the cylinder head, in comparison with the case where the shim 15 and the pressure increasing plate 16 are consolidatedly provided.

Furthermore, since the shim 15 and the pressure increasing plate 16 are separate members, the thickness of the pressure increasing plate 16 can easily be changed for each cylinder of the engine 1. Therefore, the surface pressure balance between the portion at the side of the periphery portions of the cylinders 3 and the portion outward thereof can easily be changed for each cylinder, so that the tight closure characteristic can be improved for each cylinder.

Furthermore, the first and third gasket base plates 11, 13 are stacked so that the skirt portions of the full-bead portions 11a, 13a face each other, and so that the top portions 11c, 13c thereof are apart from each other. Likewise, the second and fourth gasket base plates 12, 14 are stacked so that the skirt portions of the full-bead portions 12a, 14a face each other, and so that the top portions 12c, 14c thereof are apart from each other. Therefore, even if during assembly or the like, deviation in a direction parallel to the base plate plane occurs between the first and third gasket base plates 11, 13 or between the second and fourth gasket base plates 12, 14, the top portions of the full-bead portions do not deviate from each other in the direction perpendicular to the base plate plane. In other words, since the gasket base plates are not stacked in such a manner that the top portions of adjacent gasket base plates face each other, the top portions of the adjacent gasket base plates do not deviate from each other in the direction perpendicular to the base plate plane. In consequence, decline of the tight closure characteristic can be prevented, and occurrence of dispersion in the surface pressure can be prevented, so that stable sealing performance can be secured.

The first and second gasket base plates 11, 12 are stacked so that the top portions 11c, 12c of the full-bead portions 11a, 12a of the plates face each other, as described above. However, since the shim 15 and the pressure increasing plate 16 are interposed between the first and second gasket base plates 11, 12, the top portions 11c, 12c of the full-bead portions 11a, 12a are unlikely to deviate from each other in the direction perpendicular to the base plate plane even if the first and second gasket base plates 11, 12 deviate from each other in a direction parallel to the base plate plane. The pressure increasing plate 16, in many cases, is a metal plate of about 0.08 to 0.12 mm in thickness which has very little rigidity. Therefore, in the case where the pressure increasing plate 16 is interposed alone, without the shim 15 or the like, between the first and second gasket base plates 11, 12, there is a possibility that, if the first and second gasket base plates 11, 12 deviates from each other in a direction parallel to the base plate plane, the pressure increasing plate 16 will be pushed and bent, and the top portions 11c, 12c of the full-bead portions 11a, 12a will considerably deviate in the direction perpendicular to the base plate plane. However, in this embodiment, the shim 15 is interposed as well as the pressure increasing plate 16 between the first and second gasket base plates 11, 12. The shim 15 is a metal plate of about 0.3 to 0.5 mm in thickness. If the shim 15 and the pressure increasing plate 16 are interposed, higher rigidity is achieved than if the pressure increasing plate 16 alone is interposed. This construction reduces the deviation between the top portions 11c, 12c of the full-bead portions 11a, 12a of the first and second gasket base plates 11, 12 in the direction perpendicular to the base plate plane, and therefore reduces the effect of the deviation. Besides, if a highly rigid material is used for the shim 15, the effect of the aforementioned deviation can be minimized.

In the foregoing embodiment, the stacking of the four gasket base plates 11 to 14 heightens the follow-up characteristic with respect to the gap between the cylinder block 2 and the cylinder head associated with the increased in-cylinder pressures of the engine. The follow-up characteristic can be adjusted by changing the number of gasket base plates stacked.

For example, if the number of gasket base plates stacked is reduced to three, the follow-up characteristic slightly declines, but such an arrangement is effective for the case where the in-cylinder pressure of an engine is slightly lower than in the aforementioned case. In the case of this arrangement, first to third gasket base plates 21 to 23 may be stacked so as to form a cylinder head gasket 20 as shown in FIG. 3, or first to third gasket base plates 31 to 33 may also be stacked so as to form a cylinder head gasket 30 as shown in FIG. 4.

Figure 3:
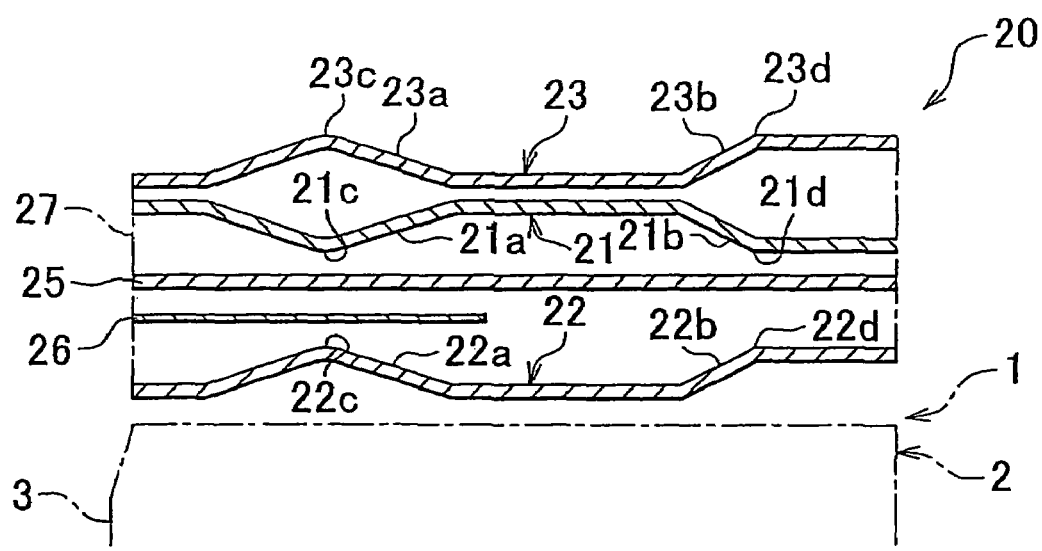
FIG. 3 is a diagram corresponding to FIG. 2 which shows a cylinder head gasket according to Modification 1.
Figure 4:
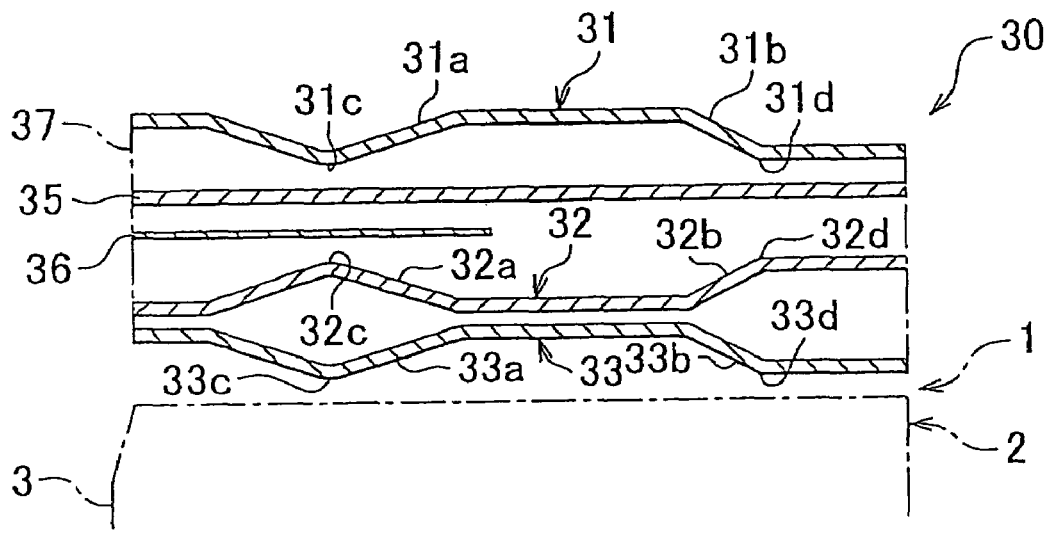
FIG. 4 is a diagram corresponding to FIG. 2 which shows a cylinder head gasket according to Modification 2.

The cylinder head gasket 20 of Modification 1 shown in FIG. 3 has a construction that is obtained by removing the fourth gasket base plate 14 from the above-described cylinder head gasket 10 shown in FIG. 2. The cylinder head gasket 30 of Modification 2 shown in FIG. 4 has a construction that is obtained by removing the third gasket base plate 13 from the above-described cylinder head gasket 10 shown in FIG. 2. The cylinder head gaskets 20, 30 of Modifications 1, 2 also achieve substantially the same operation and effects as the above-described cylinder head gasket 10.

In the case where the cylinder block is of an open-deck structure made of an aluminum-based alloy or the like, it is more suitable to use the cylinder head gasket 20 of Modification 1. A reason for that is as follows. When the cylinder head gasket 20 is interposed between the cylinder block and the cylinder head and they are integrally united via fastening bolts, a portion of the cylinder block that corresponds to or includes a cylinder liner (a portion inward of the water jacket) is compressed, so that a restoration force occurs and that portion acts as a kind of spring. On the other hand, the cylinder head, high in rigidity, does not act as a spring. In terms of sealing between the cylinder block and the cylinder head, it is more effective to stack more gasket base plates on the side of the cylinder head that does not act as a spring than on the side of the cylinder block that acts as a spring.

Figure 5:
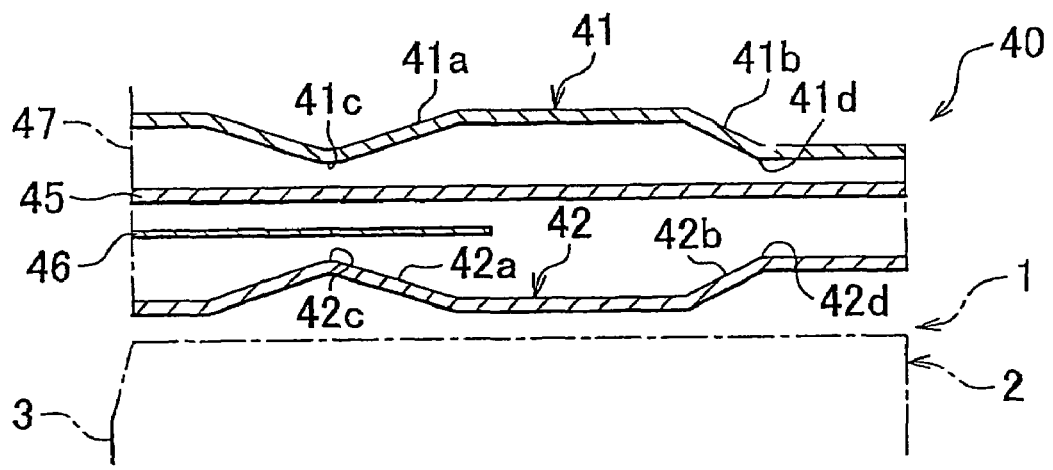
FIG. 5 is a diagram corresponding to FIG. 2 which shows a cylinder head gasket according to Modification 3.

Furthermore, if the number of gasket base plates stacked is reduced to two, the follow-up characteristic declines, but such an arrangement is effective if the in-cylinder pressure of an engine is lower than in the aforementioned case. In the case of this arrangement, first and second gasket base plates 41 to 42 may be stacked to from a cylinder head gasket 40 as shown in FIG. 5. The cylinder head gasket 40 of Modification 3 shown in FIG. 5 has a construction that is obtained by removing the third and fourth gasket base plates 13, 14 from the above-described cylinder head gasket 10 shown in FIG. 2. The cylinder head gasket 40 of Modification 3 also achieves substantially the same operation and effects as the above-described cylinder head gasket 10.

On the other hand, it is also permissible to increase the number of stacked gasket base plates to five or more so as to heighten the follow-up characteristic. Such an arrangement is effective in the case where the in-cylinder pressure of an engine is high. For example, five gasket base plates 51 to 55 may be stacked so as to form a cylinder head gasket 50 as shown in FIG. 6.

Figure 6:
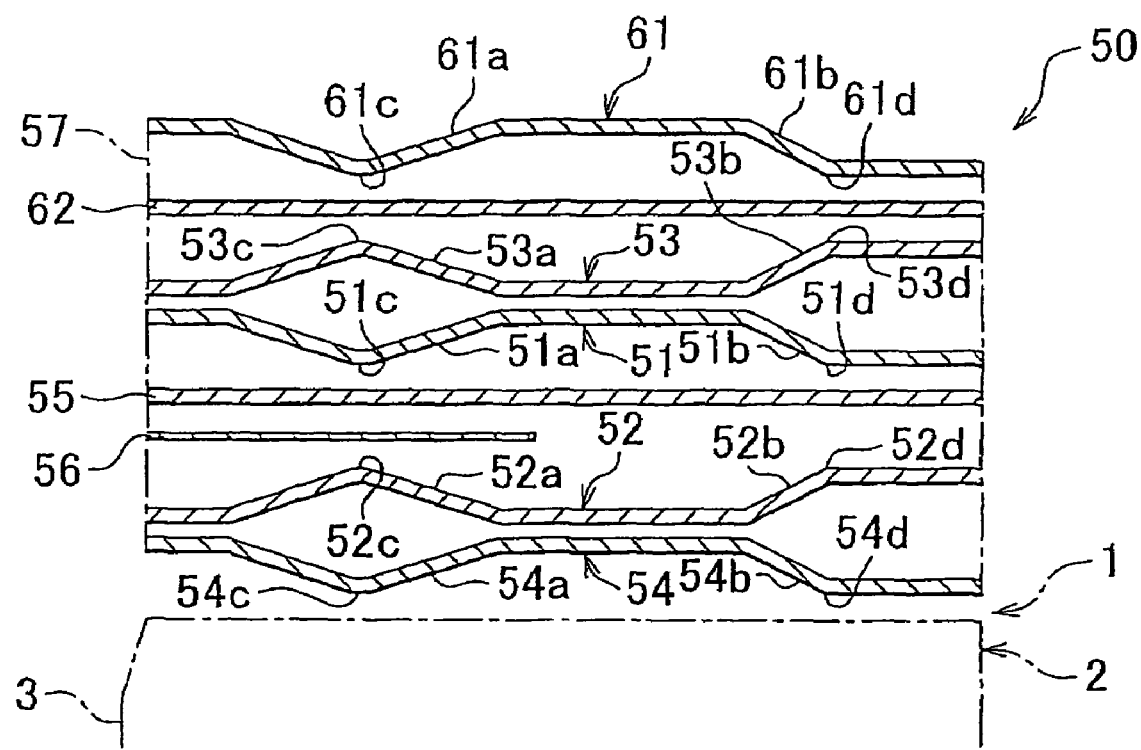
FIG. 6 is a diagram corresponding to FIG. 2 which shows a cylinder head gasket according to Modification 4.

The cylinder head gasket 50 of Modification 4 shown in FIG. 6 has a construction that is obtained by stacking a fifth gasket base plate 61 on the cylinder head side of the cylinder head gasket 10 shown in FIG. 2. The cylinder head gasket 50 of Modification 4 also achieves substantially the same operation and effects as the above-described cylinder head gasket 10. However, in this construction, since third and fifth gasket base plates 53, 61 are stacked so that top portions 53*c*, 61*c* of full-bead portions 53*a*, 61*a* of the plates face each other, a generally flat metal plate 62 is interposed between the third and fifth gasket base plates 53, 61*a* shown in FIG. 6. Therefore, even if the third and fifth gasket base plates 53, 61 deviate from each other in a direction parallel to the base plate plane, the top portions 53*c*, 61*c* of the full-bead portions 53*a*, 61*a* are unlikely to deviate from each other in the direction perpendicular to the base plate plane. Likewise, in arrangements in which the number of stacked gasket base plates is six or more, too, a generally flat metal plate is interposed between adjacent gasket base plates if the adjacent gasket base plates are stacked so that the full-bead top portions thereof face each other.

Although in the foregoing description, the shim is disposed on the cylinder head side and the pressure increasing plate is disposed on the cylinder block 2 side, it is also permissible to dispose the shim on the cylinder block 2 side and dispose the pressure increasing plate on the cylinder head.

The invention claimed is:

1. A cylinder head gasket adapted to be interposed between a cylinder block and a cylinder head, comprising:
    a first gasket base plate which has a combustion chamber hole for connecting to a combustion chamber defined by a cylinder, the first gasket base plate comprising (i) a first full bead near the combustion chamber hole, the first full bead being swollen upward and (ii) a first half bead that is swollen upward, at a position that is farther from the combustion chamber hole than the first full bead is;
    a second gasket base plate which is positioned below the first gasket base plate, and which has a combustion chamber hole for connecting to the combustion chamber at a position corresponding to the combustion chamber hole of the first gasket base plate, the second gasket base plate comprising (i) a second full bead near the combustion chamber hole, the second full bead being positioned opposite the first full bead and being swollen away from the first gasket base plate, in a direction opposite to a swelling direction of the first full bead and (ii) a second half bead that is positioned opposite the first half bead and swollen away from the first gasket base plate, in a direction opposite to a swelling direction of the first half bead, at a position that is farther from the combustion chamber hole than the second full bead is;
    a third gasket base plate which is positioned below the second gasket base plate and which has a combustion chamber hole at a position corresponding to the combustion chamber hole of the first gasket base plate, the third gasket base plate comprising (i) a third full bead near the combustion chamber hole, the third full bead being positioned opposite the second full bead and being swollen toward the second gasket base plate, in a direction opposite to a swelling direction of the second full bead, and (ii) a third half bead that is positioned opposite the second half bead and swollen toward the second gasket base plate, in a direction opposite to a swelling direction of the second half bead, at a position that is farther from the combustion chamber hole than the third full bead is;
    a thickness adjusting plate which is positioned between the second gasket base plate and the third gasket base plate, the thickness adjusting plate having a width that extends from a periphery portion of the combustion chamber hole to the cylinder head gasket periphery portion; and
    a pressure increasing plate which is positioned between the second gasket base plate and the third gasket base plate, the pressure increasing plate having (i) a first edge near a position near the combustion chamber hole of the second gasket base plate and (ii) a second edge between the second full bead and the second half bead.

2. The cylinder head gasket according to claim 1, wherein the pressure increasing plate is used to increase a surface pressure at the periphery portion of the combustion chamber hole.

3. The cylinder head gasket according to claim 1, wherein a thickness of the cylinder head gasket is adjusted by replacing with the thickness adjusting plate having a different thickness.

4. The cylinder head gasket according to claim 1, wherein the pressure increasing plate is positioned below the thickness adjusting plate.

5. The cylinder head gasket according to claim 4, wherein the thickness adjusting plate and the pressure increasing plate are positioned below the second gasket base plate and above the third gasket base plate.

6. The cylinder head gasket according to claim 1, further comprising a fourth gasket base plate which is positioned below the third gasket base plate and which has a combustion chamber hole at a position corresponding to the combustion chamber hole of the first gasket base plate, the fourth gasket base plate comprising (i) a fourth full bead near the combustion chamber hole, the fourth full bead being positioned opposite the third full bead and being swollen away from the third gasket base plate, in a direction opposite to a swelling direction of the third full bead, and (ii) a fourth half bead that is positioned opposite the third half bead and swollen away from the third gasket base plate, in a direction opposite to a swelling direction of the third half bead, at a position that is farther from the combustion chamber hole than the fourth full bead is.

7. The cylinder head gasket according to claim 6, further comprising a fifth gasket base plate which is positioned above the first gasket base plate and which has a combustion chamber hole at a position corresponding to the combustion chamber hole of the first gasket base plate, the fifth gasket base plate comprising (i) a fifth full bead near the combustion chamber hole, the fifth full bead being positioned opposite the first full bead and being swollen toward the first gasket base plate, in a direction opposite to a swelling direction of the first full bead, and (ii) a fifth half bead that is positioned opposite the first half bead and swollen toward the first gasket base plate, in a direction opposite to a swelling direction of the first half bead, at a position that is farther from the combustion chamber hole than the fifth full bead is.

8. The cylinder head gasket according to claim 7, further comprising a plate interposed between the first gasket base plate and the fifth gasket base plate.

9. The cylinder head gasket according to claim 1, wherein the first gasket base plate further comprises a planar portion between the first full bead and the first half bead.

10. A cylinder head gasket adapted to be interposed between a cylinder block and a cylinder head, comprising:
   a first gasket base plate which has a combustion chamber hole for connecting to a combustion chamber defined by a cylinder, the first gasket base plate comprising (i) a first full bead near the combustion chamber hole, the first full bead being swollen downward and (ii) a first half bead that is swollen downward, at a position that is farther from the combustion chamber hole than the first full bead is;
   a second gasket base plate which is positioned below the first gasket base plate and which has a combustion chamber hole at a position corresponding to the combustion chamber hole of the first gasket base plate, the second gasket base plate comprising (i) a second full bead near the combustion chamber hole, the second full bead being positioned opposite the first full bead and being swollen toward the first gasket base plate, in a direction opposite to a swelling direction of the first full bead, and (ii) a second half bead that is positioned opposite the first half bead and swollen toward the first gasket base plate, in a direction opposite to a swelling direction of the first half bead, at a position that is farther from the combustion chamber hole than the second full bead is;
   a third gasket base plate which is positioned below the second gasket base plate and which has a combustion chamber hole at a position corresponding to the combustion chamber hole of the first gasket base plate, the third gasket base plate comprising (i) a third full bead near the combustion chamber hole, the third full bead being positioned opposite the second full bead and being swollen away from the second gasket base plate, in a direction opposite to a swelling direction of the second full bead, and (ii) a third half bead that is positioned opposite the second half bead and swollen away from the second gasket base plate, in a direction opposite to a swelling direction of the second half bead, at a position that is farther from the combustion chamber hole than the third full bead is;
   a thickness adjusting plate which is positioned between the first gasket base plate and the second gasket base plate, the thickness adjusting plate having a width that extends from a periphery portion of the combustion chamber hole to a cylinder head gasket periphery portion; and
   a pressure increasing plate which is positioned between the first gasket base plate and the second gasket base plate, the pressure increasing plate having (i) a first edge near a position near the combustion chamber hole of the second gasket base plate and (ii) a second edge between the second full bead and the second half bead.

11. The cylinder head gasket according to claim 10, wherein the pressure increasing plate is used to increase a surface pressure at the periphery portion of the combustion chamber hole.

12. The cylinder head gasket according to claim 10, wherein a thickness of the cylinder head gasket is adjusted by replacing with the thickness adjusting plate having a different thickness.

13. The cylinder head gasket according to claim 10, wherein the first gasket base plate further comprises a planar portion between the first full bead and the first half bead.

14. The cylinder head gasket according to claim 10, wherein the pressure increasing plate is positioned below the thickness adjusting plate.

15. The cylinder head gasket according to claim 14, wherein the thickness adjusting plate and the pressure increasing plate are positioned below the first gasket base plate and above the second gasket base plate.

16. A combination, comprising:
   a cylinder block;
   a cylinder head; and
   a cylinder head gasket according to claim 1, interposed between the cylinder block and the cylinder head.

17. A combination, comprising:
   a cylinder block;
   a cylinder head; and
   a cylinder head gasket according to claim 10, interposed between the cylinder block and the cylinder head.

* * * * *